(12) United States Patent
Henning et al.

(10) Patent No.: US 8,595,916 B2
(45) Date of Patent: Dec. 3, 2013

(54) METHOD FOR PRODUCING HIGH-PRESSURE SENSORS

(75) Inventors: Frank Henning, Reutlingen (DE); Wilhelm Frey, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/125,086

(22) PCT Filed: Aug. 25, 2009

(86) PCT No.: PCT/EP2009/060896
§ 371 (c)(1),
(2), (4) Date: Jul. 1, 2011

(87) PCT Pub. No.: WO2010/046157
PCT Pub. Date: Apr. 29, 2010

(65) Prior Publication Data
US 2011/0252621 A1     Oct. 20, 2011

(30) Foreign Application Priority Data
Oct. 21, 2008   (DE) .......................... 10 2008 042 982

(51) Int. Cl.
*H01S 4/00* (2006.01)

(52) U.S. Cl.
USPC ............................. 29/592.1; 29/593; 204/418

(58) Field of Classification Search
USPC .................... 29/592.1, 593; 204/418
See application file for complete search history.

(56) References Cited

U.S. PATENT DOCUMENTS

| 3,410,779 | A | * | 11/1968 | Whitehead, Jr. et al. ...... 204/408 |
| 5,255,427 | A | | 10/1993 | Hafner |
| 5,829,520 | A | * | 11/1998 | Johnson ................... 166/250.01 |
| 5,867,886 | A | | 2/1999 | Ratell et al. |
| 6,740,216 | B2 | * | 5/2004 | Diakonov et al. ............. 204/418 |
| 8,241,474 | B2 | * | 8/2012 | Jiang et al. .................... 204/433 |
| 2002/0152817 | A1 | | 10/2002 | Landgraf et al. |
| 2005/0000292 | A1 | | 1/2005 | Muchow et al. |

FOREIGN PATENT DOCUMENTS

| DE | 199 34 114 | 1/2001 |
| EP | 1 619 488 | 1/2006 |
| JP | 09-101218 | 4/1997 |
| JP | 2000-241273 | 9/2000 |
| JP | 2006-220430 | 8/2006 |

* cited by examiner

*Primary Examiner* — Carl Arbes
(74) *Attorney, Agent, or Firm* — Kenyon & Kenyon LLP

(57) ABSTRACT

A construction concept for high-pressure sensors is provided, which enables simple and economical production of reliable high-pressure sensors even for pressure ranges above 2200 bar. A high-pressure sensor of this kind encompasses a sensor element for pressure sensing and a connector piece for coupling the sensor element to a system to be measured. A diaphragm is embodied in the base element of the sensor element, and a pressure conduit is embodied in the base element of the connector piece. The sensor element is mounted on the connector piece so that the pressure to be measured is able to act upon the diaphragm via the pressure conduit. Firstly the base element of the sensor element is mounted on the base element of the connector piece, a full-area connection being generated between the mounting surfaces of the two base elements. Only thereafter is the pressure conduit configured in the connector piece, and the diaphragm of the sensor element exposed.

6 Claims, 1 Drawing Sheet

METHOD FOR PRODUCING HIGH-PRESSURE SENSORS

FIELD OF THE INVENTION

The present invention relates to a method for producing high-pressure sensors having a sensor element for pressure sensing, and having a connector piece for coupling the sensor element to a system to be measured. A diaphragm is embodied in the base element of the sensor element, and a pressure conduit is embodied in the base element of the connector piece. The sensor element is mounted on the connector piece in such a way that the pressure to be measured is able to act upon the diaphragm via the pressure conduit.

BACKGROUND INFORMATION

A variety of concepts for constructing high-pressure sensors having a sensor element and a connector piece are known from practical use.

These two components are usually fabricated independently of one another from a metallic base element. In the case of the sensor element, the base element is equipped with a blind opening in order to expose a diaphragm in the oppositely located surface of the base element. Circuit elements for signal acquisition are disposed on this surface, semiconductor technology methods being used, for example, for this purpose. A pressure conduit is embodied in the base element of the connector piece. In addition, the connector piece can also be equipped, for example, with a thread for coupling to the system to be measured. The sensor element is then mounted on the connector piece in such a way that the rearward blind opening of the sensor element is disposed in alignment with the pressure conduit in the connector piece.

This mounting of the sensor element on the connector piece proves to be problematic in practical use.

For cost reasons, the sensor element is usually welded to the connector piece. Care must be taken in this context that neither the pressure conduit in the connector piece nor the blind opening of the sensor element becomes sealed off, contaminated, or unfavorably deformed; this complicates production of a welded connection having reproducible mechanical properties. The compressive strength of the welded connection is influenced by the geometry of the weld bead and of the contact surfaces with respect to the sensor element and the connector piece. Notches or depressions in the welded connection constitute initiation points for cracks under high pressure loads, in particular in the case of pulsating loads. The field of application of such high-pressure sensors is therefore typically limited to pressure ranges below 2200 bar.

Clamped connections are more reliable than a welded connection between the sensor element and connector piece. They are suitable even for use at pressures greater than 10,000 bar. The costs associated therewith are, however, very high, so that this construction and connection technology is utilized only in very small production runs for special applications.

The sensor element and the connector piece can also be produced in one piece from a metallic base element. In this case, however, because of the component size, the circuit elements for signal acquisition cannot readily be applied onto the sensor diaphragm using semiconductor technology methods.

SUMMARY OF THE INVENTION

The present invention provides a construction concept for high-pressure sensors that enables simple and economical production of reliable high-pressure sensors even for pressure ranges above 2200 bar.

This is achieved according to the present invention in that the base element of the sensor element is mounted on the base element of the connector piece, a full-area connection being generated between the mounting surfaces of the two base elements. Only thereafter is the pressure conduit configured in the connector piece, and the diaphragm of the sensor element exposed.

What has been recognized according to the present invention is specifically that in terms of process engineering, it is substantially simpler to create a reproducible and particularly pressure-resistant welded connection between the mounting surfaces of the two components (sensor element and connector piece) if the continuity of a through conduit does not need to be taken into account. Alignment of the two components is also very uncomplicated in this case. According to the present invention, the pressure conduit in the connector piece and the blind opening, adjacent thereto, in the sensor element are generated only later, in a method that optionally may also have multiple stages. The composite unit made up of the sensor element and connector piece is in this context, advantageously treated as one workpiece.

In a particularly advantageous variant of the method according to the present invention, circuit elements for signal acquisition are applied onto the base element of the sensor element in the diaphragm region before the base element of the sensor element is mounted on the base element of the connector piece. With this method variant, the circuit elements can also be implemented using technologies that, because of the dimensions of the connector piece, can no longer readily be utilized after assembly, for example by the application of semiconductor processes. The circuit elements can thus easily be implemented in a thin-layer structure having at least one deflection-sensitive, i.e. for example piezoresistive or piezoelectric, layer.

In the context of the method according to the present invention, sensor elements and connector pieces made of steel or a steel alloy are preferably used. The two components of the pressure sensor construction according to the present invention can likewise be implemented in the form of blanks made of a sintered material. With these materials, the full-area connection between the two base elements is advantageously produced by welding. The pressure conduit in the connector piece and the diaphragm of the sensor element can then easily be configured using a suitable technology, for example electropolishing, drilling, or milling. Depending on the materials of the base element and the desired shape of the pressure connection, different methods can also be combined for this purpose.

DETAILED DESCRIPTION

Figure 1:
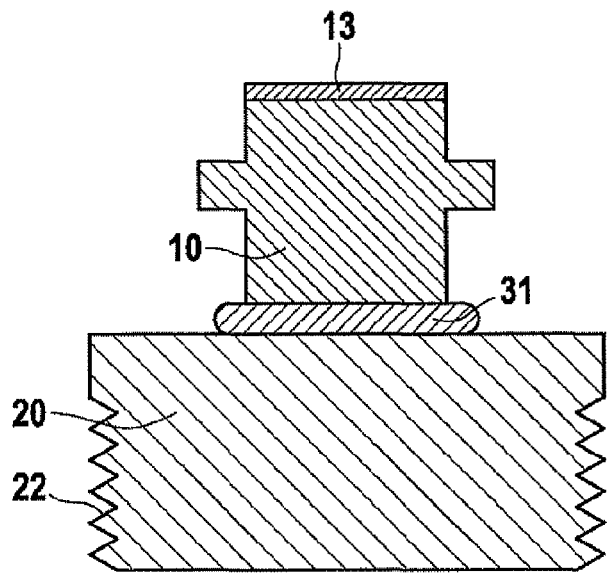
FIG. 1 is a schematic sectioned depiction through the base element of a sensor element after mounting on the base element of a connector piece.
Figure 2:
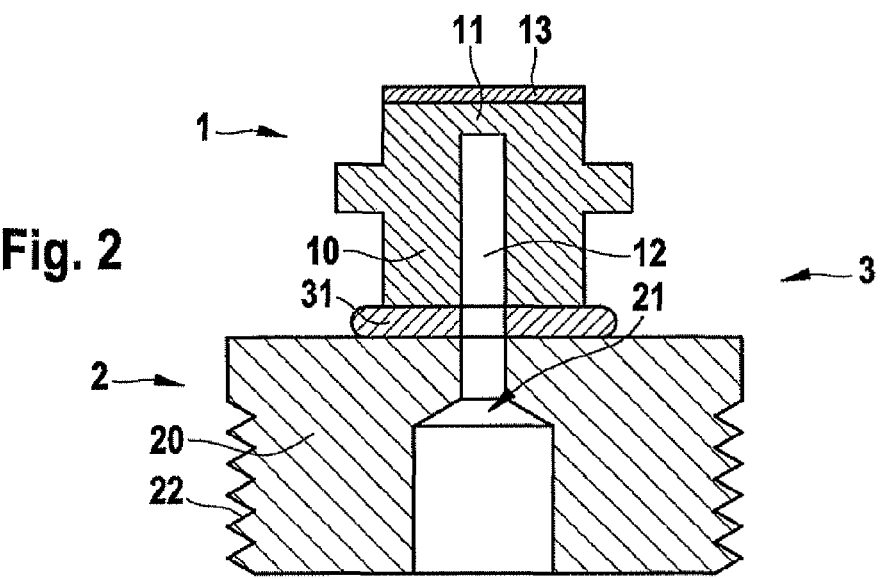
FIG. 2 is a schematic sectioned depiction through the construction depicted in FIG. 1, after introduction of a pressure connection and formation of a diaphragm.

FIGS. 1 and 2 illustrate the method according to the present invention for producing a high-pressure sensor 3 (as depicted in FIG. 2) having a sensor element 1 for pressure sensing and having a connector piece 2 for coupling sensor element 1 to a system to be measured. According to the present invention, base element 10 of sensor element 1 is mounted on base element 20 of connector piece 2 before a diaphragm 11 is configured in sensor element 1 and a suitable pressure connector, in the form of a blind opening 12 in sensor element 1 and a pressure conduit 21 adjoining it, is configured in connector piece 2. This structuring of the two base elements 10 and 20 is accomplished only after a full-area connection 31 has been produced between the mounting surfaces of the two base elements 10 and 20.

FIG. 1 shows the construction after assembly of the two base elements 10 and 20. Base element 10 of sensor element 1 is a relatively thin metallic support on which a thin-layer construction 13 was created, after assembly, with the aid of semiconductor processes. This thin-layer construction 13 encompasses circuit elements for signal acquisition, e.g. of a piezoresistive, piezoelectric, or capacitive type. Connector piece base element 20 is likewise made of a metallic material, for example steel or a steel alloy. In the context of a prefabricating operation, it was equipped with an external thread 22 for coupling to a system to be measured. The surface of sensor element base element 10 located opposite thin-layer construction 13 was welded over its entire surface to the mounting surface of connector piece base element 20. The resulting full-area weld bead 31 represents a very stable and, in particular, pressure-resistant connection.

FIG. 2 illustrates that diaphragm 11 and pressure connector 12, 21 were exposed only after the assembly operation explained in further detail in connection with FIG. 1. In the exemplifying embodiment depicted here, this was done in a two-stage drilling process. With a first drill, an orifice that constitutes approximately three-quarters of pressure conduit 21 was generated in the back side of connector piece base element 20, i.e. in the surface located opposite the mounting surface. This orifice was then continued, using a second drill of smaller diameter, through weld bead 31 and into sensor element base element 10. In this context, a blind opening 12 was produced in sensor element base element 10, and diaphragm 11 was exposed.

What is claimed is:

1. A method for producing a high-pressure sensor having a sensor element for pressure sensing, and having a connector piece for coupling the sensor element to a system to be measured, the method comprising:
   providing a diaphragm in a base element of the sensor element;
   providing a pressure conduit in a base element of the connector piece;
   mounting the sensor element on the connector piece so that the diaphragm can be impinged upon by a pressure to be measured via the pressure conduit; and
   mounting the base element of the sensor element on the base element of the connector piece, a full-area connection being generated between the mounting surfaces of the two base elements, wherein only thereafter is the pressure conduit provided in the connector piece, and the diaphragm of the sensor element exposed.

2. The method according to claim 1, further comprising applying a thin-layer construction having circuit elements for signal acquisition onto the base element of the sensor element in a diaphragm region before the base element of the sensor element is mounted on the base element of the connector piece.

3. The method according to claim 1, wherein at least one of the sensor element and the connector piece is one of (a) produced from steel or a steel alloy, (b) implemented in the form of a blank made of a sintered material, or (c) produced from bulk metallic glass in a reshaping process.

4. The method according to claim 1, wherein the full-area connection between the two base elements is produced by welding.

5. The method according to claim 1, wherein the providing of the pressure conduit in the connector piece and the exposure of the diaphragm of the sensor element are accomplished in a multi-stage process.

6. The method according to claim 5, wherein the multi-stage process includes a combination of drilling, milling and/or electropolishing processes.

* * * * *

UNITED STATES PATENT AND TRADEMARK OFFICE
CERTIFICATE OF CORRECTION

PATENT NO. : 8,595,916 B2
APPLICATION NO. : 13/125086
DATED : December 3, 2013
INVENTOR(S) : Henning et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 29 days.

Signed and Sealed this
Twenty-second Day of September, 2015

Michelle K. Lee
*Director of the United States Patent and Trademark Office*